United States Patent

[11] 3,609,737

| [72] | Inventors | Martin Howard Lustig<br>Rochester;<br>Norman Robert LaFond, Webster, both of N.Y. |
|---|---|---|
| [21] | Appl. No. | 740,942 |
| [22] | Filed | June 28, 1968 |
| [45] | Patented | Sept. 28, 1971 |
| [73] | Assignee | Xerox Corporation<br>Rochester, N.Y. |

[54] METHOD AND APPARATUS FOR ARTICLE DETECTION UTILIZING CORONA DISCHARGE
6 Claims, 4 Drawing Figs.

| [52] | U.S. Cl. | 340/259, 324/54 |
|---|---|---|
| [51] | Int. Cl. | G08b 21/00 |
| [50] | Field of Search | 340/259, 258; 324/72, 54 |

[56] References Cited
UNITED STATES PATENTS

| 2,996,630 | 8/1961 | Bensema et al. | 340/259 UX |
|---|---|---|---|
| 3,321,703 | 5/1967 | Tyszewicz | 324/54 |
| 3,339,125 | 8/1967 | Almy | 340/258 CX |

*Primary Examiner*—John W. Caldwell
*Assistant Examiner*—Michael Slobasky
*Attorneys*—James J. Ralabate, John E. Beck and Laurence A. Wright ABSTRACT: A sensor for detecting the presence or absence of support material passing in a predetermined path of movement. The sensor comprises a pair of spaced electrodes positioned adjacent the path of support material movement with the support material passing therebetween. The electrodes are supported by a suitable insulator and the spacing and voltage differential therebetween predetermined to generate a current which indicates the presence or absence of a support material passing between the electrodes. The output from the sensors is coupled to a suitable detector to control the operation of the automatic xerographic reproducing machine in accordance with the passage of the support material.

METHOD AND APPARATUS FOR ARTICLE DETECTION UTILIZING CORONA DISCHARGE

BACKGROUND OF THE INVENTION

This invention relates to article detection and, in particular, to the sensing of support material in an automatic document reproducing machine.

More specifically, this invention relates to a monitoring apparatus for detecting the presence of support material in an automatic xerographic reproducing machine and to control the operation of the reproducing machine in accordance with the presence or nonpresence of support material.

In the process of xerography, a xerographic plate comprising a layer of photoconductive material on a conductive backing is given a uniform electric charge over its surface and then exposed to the subject matter to be reproduced by various projection techniques. This exposure discharges the plate in accordance with the light intensity reaching it, thereby creating a latent electrostatic image on or in the plate.

Development of the image is effected by developers which comprise, in general, a mixture of suitable pigmented or dyed resin-based powder, hereinafter referred to as toner, and a granular carrier material which functions to generate triboelectric charges on, and to carry the toner. More specifically, the function of the carrier material is to provide mechanical control of the toner, or to carry the toner to an image surface and simultaneously provide almost complete homogenity of charge polarity. In the development of the image, the toner powder is brought into surface contact with the photoconductive coating and is held thereon electrostatically in a pattern corresponding to the latent electrostatic image. Thereafter, the developed xerographic image is usually transferred to a support material to which it may be permanently affixed by any suitable means such as heat fusing.

In the mixture of toner particles and carrier material, the toner particles, which are many times smaller than the carrier material, adhere to and coat the surface of the carrier material due to the triboelectric attraction therebetween. During development, as the toner-coated carrier material rolls or tumbles over the xerographic plate carrying a latent electrostatic image of opposite polarity to the charge on the toner, toner particles are pulled away from the carrier by the latent electrostatic image and deposited on the plate to form a developed toner-powder image. As toner-powder images are formed, additional toner powder must be supplied to the developer mixture to replenish the toner deposited on the xerographic plate. The toner material may be of the type disclosed in Carlson Pat. No. 2,940,934, wherein the toner particles comprise a finely divided pigmented resin having a particle size less than 20 microns and preferably an average particle size between about 5 and 10 microns and comprising a finely divided uniform mixture of pigment in a nontacky, low-melting resin. Desirably, the pigment will be a black pigment such as carbon black or other minutely divided carbonaceous pigment.

After the latent electrostatic image has been developed by the application of the toner particles, the image is transferred from the photoconductive surface to a sheet of support material to which the toner-powder image is permanently fixed as by heat fusing.

In an automatic xerographic reproducing machine, it is desirable that a sheet of support material passing through the reproducing apparatus be closely monitored to detect the clogging of support material inside the reproducing apparatus and to control the operation of the reproducing machine in the event that a sheet of support material becomes jammed therein. In automatic xerographic reproducing machines, it is sometimes desirable that a sheet of support material be electrostatically secured to a transport mechanism for further processing and, due to the minute electrostatic forces securing the support material to the transport mechanism a major problem existed in monitoring the support material passing through the reproducing apparatus. This problem was further aggravated in the portions of the machine where an original document is illuminated by high intensity flashlamps to form the latent electrostatic image on the photoreceptor surface, and in the image fixing area whereat the toner-powder image transferred to the support material is permanently affixed thereto by a high intensity radiant energy source.

Due to the low forces of the electrostatic charge securing the support material to the electrostatic sheet transport, a mechanically actuated switch could not be positioned in the path of the paper movement to be actuated by contacting the support material. The electrostatic forces securing the support material to the transport mechanism are of such a minute magnitude as to be insufficient to enable the support material to contact a mechanically actuable switch without the paper being stripped from the electrostatic transport mechanism and becoming jammed within the reproducing apparatus. In addition, many of the support material transports throughout the automatic xerographic reproducing machine do not utilize any external forces to maintain the support material on the transport and, therefore, a mechanically actuated switch would deflect the support material from the desired path of movement.

Furthermore, due to the high intensity of radiant energy and the incandescency of the source of radiant energy in the exposure and fixing portions of the reproducing machine, a photosensor could not be utilized as a monitoring apparatus even though the problems associated with physical contact of the support material would be eliminated. The magnitude of light intensity from the exposure lamps and fuser would actuate the photosensor at all times regardless of the presence or nonpresence of support material. Also, photosensors in portions of the machine wherein minute electroscopic toner powder is present creates a further problem in the use of the photosensors as monitoring devices. Since the toner powder is electrostatically charged, it has a high degree of affinity for grounded or oppositely charged mechanisms within the machine. Therefore, the toner powder accumulates on the photosensor and light source causing erratic operation of the monitoring device and decreasing the photosensors reliability. In addition, cost considerations and the short life of the light source requiring frequent replacement rendered a photosensor monitoring system considerably.

SUMMARY OF THE INVENTION

It is, therefore, an object of this invention to improve article detection.

Another object of this invention is to improve monitoring apparatus by eliminating physical contact of the monitoring apparatus with the material to be detected.

A further object of this invention is to improve support material monitoring devices by controlling the operation of the monitoring device independently of ambient radiation energy.

These and other objects are attained in accordance with the present invention wherein there is provided a sensor for detecting the presence or absence of support material passing in a predetermined path of movement. The sensor comprises a pair of spaced electrodes positioned adjacent the path of support material movement with the support material passing therebetween. The electrodes are supported by a suitable insulator and the spacing and voltage differential therebetween predetermined to generate a current which indicates the presence or absence of a support material passing between the electrodes. The output from the sensors is coupled to a suitable detector to control the operation of the automatic xerographic reproducing machine in accordance with the passage of the support material.

DESCRIPTION OF THE DRAWINGS

Further objects of this invention, together with additional features contributing thereto and advantages accruing therefrom will be apparent from the following description of one embodiment of the invention when read in conjunction with the accompanying drawings, wherein.

DESCRIPTION OF A PREFERRED EMBODIMENT

Figure 1:
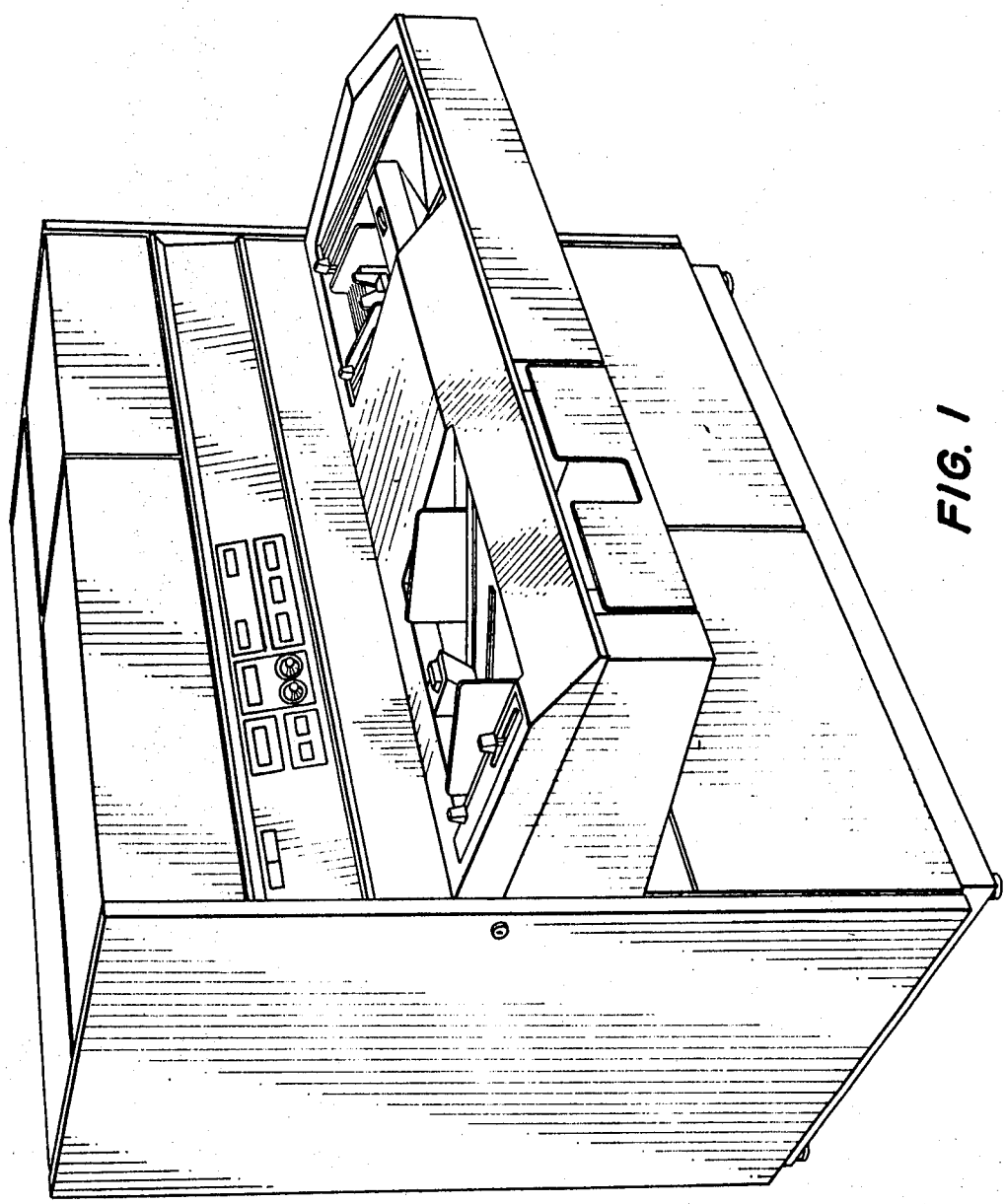
FIG. 1 is a front perspective view of an automatic xerographic reproducing machine utilizing the invention of this application.

Referring now to the drawings, there is shown in FIG. 1 an automatic xerographic reproducing machine wherein the subject matter of this invention is utilized. Although it should be noted that the invention is not intended to be limited thereto, the invention will be described with reference to its use therein for convenience of illustration.

Figure 2:
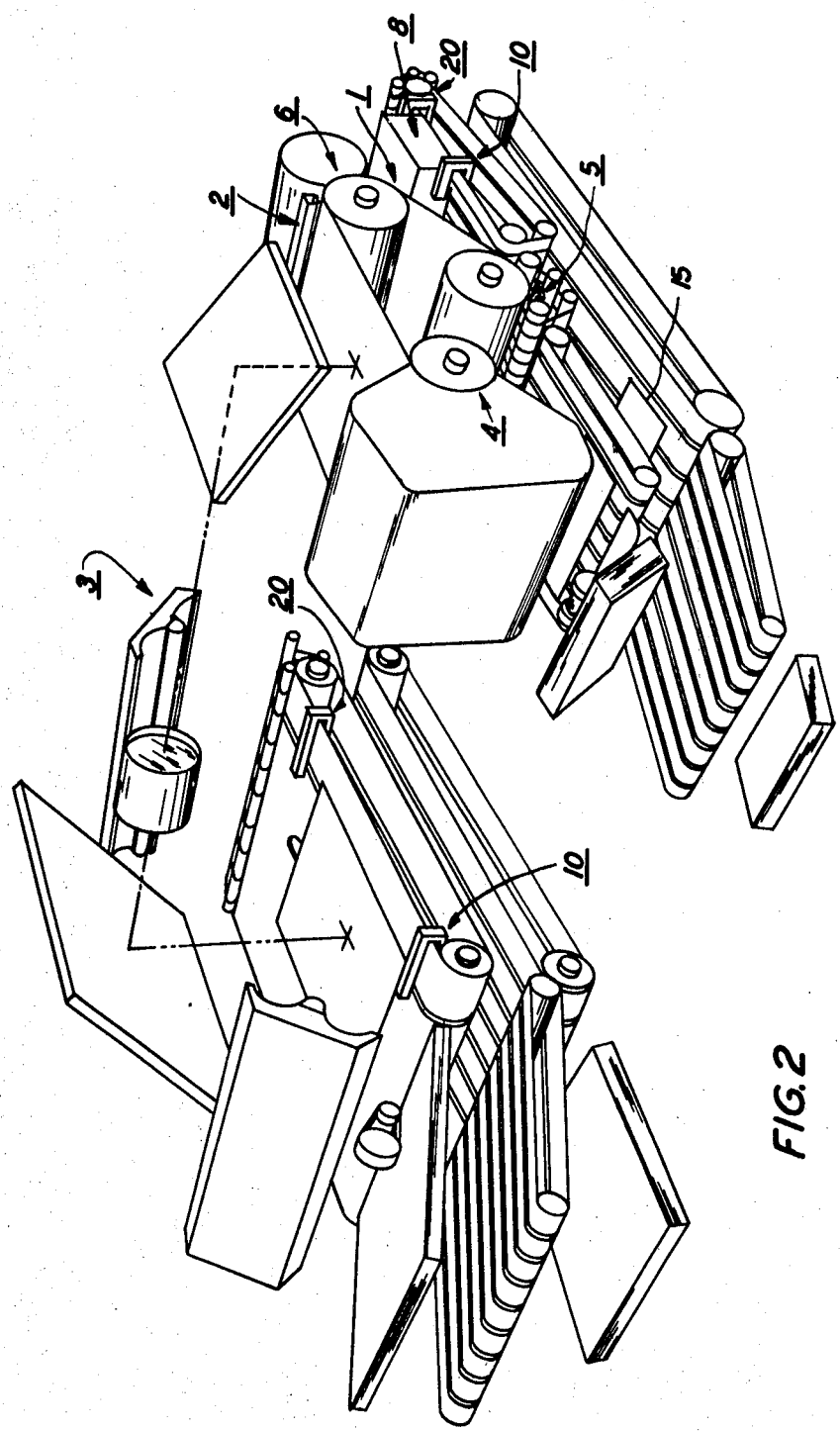
FIG. 2 is a mechanical schematic of the xerographic portion of the automatic xerographic reproducing machine shown in FIG. 1 to better illustrate the use of the invention of this application.
Figure 3:
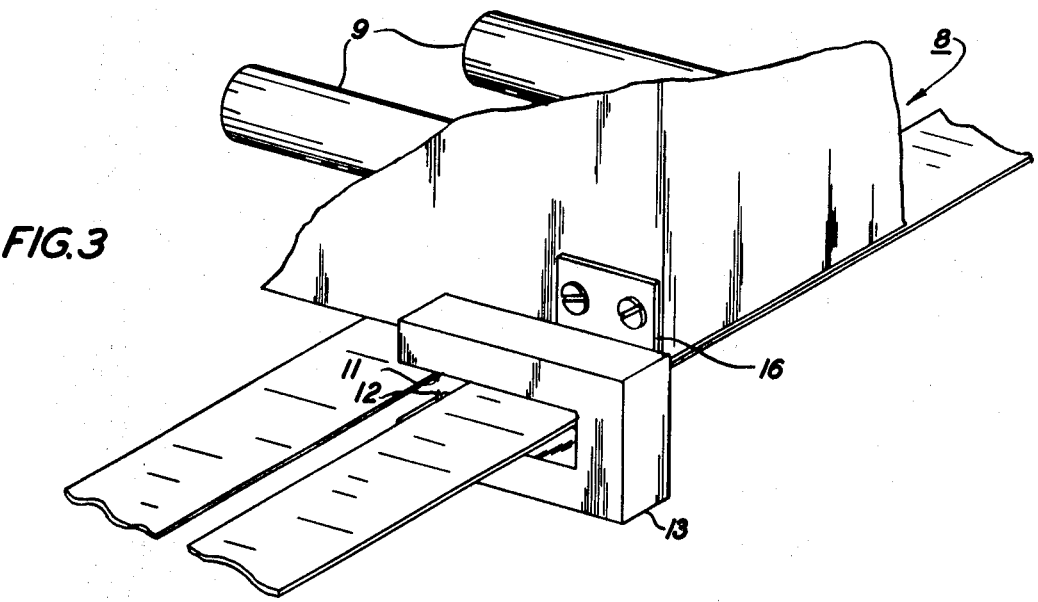
FIG. 3 is a perspective view of the sensor apparatus.

The automatic xerographic reproducing machine includes (FIG. 2) a xerographic plate 1 including a photoconductive layer or light receiving surface on a conductive backing, formed into an endless web and supported in a frame to rotate in the direction indicated by the arrow to cause the plate surface to sequentially pass a series of xerographic processing stations.

For the purpose of the present disclosure, the several xerographic processing stations in the path of movement of the plate surface may be described functionally as follows:

a charging station 2 at which a uniform electrostatic charge is deposited on or in the photoconductive plate;

an exposure station 3 at which a light or radiation pattern of copies to be reproduced is projected onto the plate surface by means of high intensity intermittent flashlamps to dissipate the charge in the exposed areas thereof to thereby form a latent electrostatic image of the copy to be reproduced;

a developing station 4 at which the xerographic developing material, including toner particles having electrostatic charge opposite to that of the latent electrostatic image, is cascaded over the plate surface whereby the toner particles adhere to the latent electrostatic image to form a toner-powder image in configuration of the copy being reproduced;

a transfer station 5 at which the toner-powder image is electrostatically transferred from the plate surface to a transfer material or a support surface; and a plate cleaning and discharge station 6 at which the plate surface is brushed to remove residual toner particles remaining thereon after image transfer, and exposed to a relatively bright light source to effect substantially complete discharge of any residual electrostatic charge remaining thereon or therein.

It is felt that the preceding description of the xerographic process is sufficient for better understanding of the utilization of this invention.

The sensor apparatus 10 comprises a pair of needle point electrodes 11 and 12 spaced a predetermined distance apart (approximately one-half inch) by means of a U-shaped support 13 which preferably is comprised of an insulative material (such as Polyethylene, Teflon or Delrin) to electrically isolate the two electrodes. One of the two electrodes 11 is coupled to a high voltage source of approximately 6,000 volts and the other electrode 12 is coupled to ground. A sensing resistor R-1, preferably of approximately 1,000 ohms, is connected in series with grounded (or lower potential) electrode 12 to produce a desired predetermined current flow of approximately 10 microamps. The current flow is sensed across the resistor R-1 in series with the lower potential electrode 12.

The sensor 10 is supported adjacent the path of support material travel at the exposure station 3 and at the fixing apparatus 8 with the support material 15 passing between the spaced electrodes 11 and 12. Although the operation of the sensor apparatus at both the exposure station and the fixing station are similar, for convenience of illustration the operation of the sensor 10 will be described with reference to its use at the fixing station.

After a toner-powder image has been transferred from the xerographic plate 1 to a support material 15, the toner-powder image bearing support material is forwarded to the fixing apparatus 8 whereat the toner powder image is exposed to an intermittently operated flashlamp 9 which generates a high intensity flash of radiant energy to permanently bond the toner-powder image to the support material. The sensor assembly 10 is supported from the fuser 8 at the entrance thereto by means of suitable brackets 16 and positioned such that the support material passes between the electrodes thereby changing the current flow therebetween.

A second sensor 20, similar in construction to sensor 10, is positioned at the egress of the fuser 8 and supported therefrom such that the fused support material passes between the electrodes 11 and 12 to produce a change in the current flow. The outputs from both sensors 10 and 20 positioned at the entrance and egress of the fuser 8, respectively, are electrically coupled into the circuit shown in FIG. 4.

Figure 4:
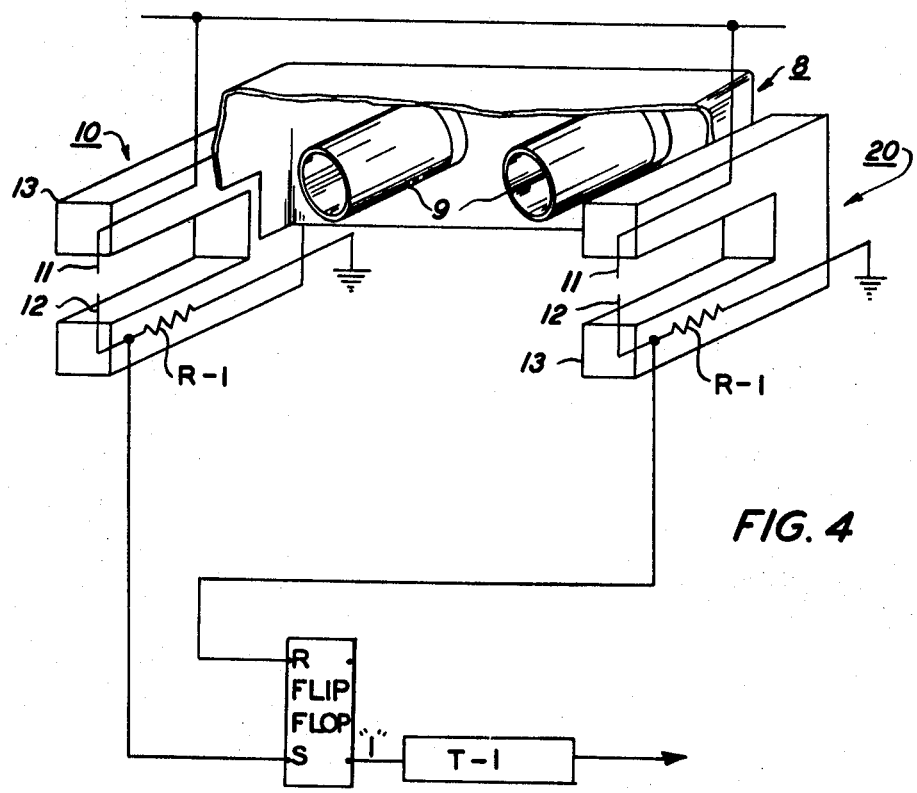
FIG. 4 is an electrical schematic of the sensor apparatus of this invention coupled into a suitable control circuit for controlling the operation of the apparatus shown in FIG. 1 in accordance with the presence or absence of support material.

Referring now to FIG. 4, if a toner-powder image bearing support material passes between the electrodes of sensor 10 positioned at the entrance to the fuser 8, the output from the sensor coupled to the input terminal S of the bistable flip-flop causes the flip-flop to be set producing a high or logic "1" output from the flip-flop to energize a timer T-1, a suitable timer being model CDD-21 available from Potter and Brumfield, Inc., Princeton, Indiana. The setting of the flip-flop energizes the timer T-1 to begin a cycle wherein the timed delay is slightly greater than the time required for the support material to pass through a normal path of movement beneath the radiant fusing elements of the fixing apparatus 8. During normal operation, the support material will pass through the fixing apparatus 8 and between the electrodes of the sensor 20 positioned at the fusing egress in a shorter period of time than the time delay of timer T-1. In this event the output from sensor 20, coupled to the reset terminal R resets the flip-flop. The logic "1" output from the flip-flop is terminated or goes to a logic "0" condition thereby resetting the timer T-1 for another cycle.

In the event the support material becomes jammed or stopped in the fixing apparatus 8 it is desirable to prevent energization of the high intensity radiant energy flashlamps to prevent a possible fire within the reproducing apparatus. Therefore, when the support material passes through sensor 10 thereby energizing the timer T-1, if the support material does not pass between the electrodes of sensor 20 within a period determined by timer T-1, a jam will be indicated. The output from the timer T-1 is coupled to a suitable control circuit to prevent energization of the high intensity radiant energy flashlamps and to energize a suitable indicator such as a lamp or buzzer on the control panel of the automatic xerographic reproducing machine shown in FIG. 1.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. Apparatus for detecting the passage of an article along a predetermined path of movement comprising:

means for transporting an article along a predetermined path of movement extending into and out of a processing station said article being acted upon while in said processing station, first switch means positioned at the entrance to said processing station and adapted to be actuated by said article passing in operative contact therewith, second switch means positioned at the exit of said processing station and adapted to be actuated by said article passing in operative contact therewith said first and second switch means each comprising a pair of spaced electrodes having a current flow therebetween and positioned in said path of movement so that an article transported therealong passes between said electrodes, a control circuit electrically coupled to said first and second switch means comprising bistable means actuable to generate a first output signal in response to said article passing between the electrodes of said first switch means and a second output signal in response to said article passing between the electrodes of said second switch means, and timing means actuable in response to said first output signal of said bistable means for generating a signal indicative of the failure of said article to pass through said processing station when said first output signal continues for a predetermined lapse of time.

2. The apparatus of claim 1 wherein said bistable means is disabled by said article passing between the electrodes of said second switch means said bistable means thence providing a second output signal to stop the running of said timing means.

3. The apparatus of claim 2 wherein said first and second switch means are spaced approximately one-half inch apart.

4. The apparatus of claim 3 wherein said apparatus includes an approximately 1,000 ohm resistor in series with each of said first and second switch means.

5. Apparatus for detecting the passage of an article from the input side of a processing station to the output side of said processing station comprising:

support means carrying a first and second pair of oppositely positioned needlepoint electrodes, each of said pair of needlepoint electrodes being spaced a predetermined distance apart, a voltage source coupled to said electrodes for maintaining a predetermined current flow between said first and second pair of electrodes, bistable means responsive to a change in current through said first and second pair of electrodes for changing from a first state to a second state and back to a first state upon the passage of said article through said processing station, and timing means coupled to said bistable means for indicating failure of said article to exit from said processing station when said bistable means remains in said second state for a predetermined lapse of time.

6. The apparatus of claim 5 wherein said voltage means coupled to each of said first and second switch means maintains an approximately 6,000 volt potential between the electrodes of said first and second switch means.